Oct. 29, 1968     W. A. BERGLUND     3,408,119
SAFETY VALVE SYSTEM FOR BRAKE LINES
Filed Aug. 29, 1966

INVENTOR:
WILHELM A. BERGLUND
BY
Mason, Kolehmainen, Rathburn & Wyss
ATT'YS

United States Patent Office 3,408,119
Patented Oct. 29, 1968

3,408,119
SAFETY VALVE SYSTEM FOR BRAKE LINES
Wilhelm A. Berglund, 6834 W. Ardmore Ave.,
Chicago, Ill. 60631
Filed Aug. 29, 1966, Ser. No. 575,881
6 Claims. (Cl. 303—84)

ABSTRACT OF THE DISCLOSURE

There is provided a safety valve assembly for a brake line having a piston mounted therein for free sliding movement and dividing the valve cylinder into inlet and outlet chambers. Should a fluid leak occur downstream of the safety valve assembly, the pressure in the discharge chamber in the cylinder is rapidly reduced to zero and the piston moves downstream to close off and lock at the discharge end so that no fluid will be lost from the master cylinder.

---

The present invention relates to a novel safety valve system for use in hydraulic brake systems to automatically isolate remote brake wheel cylinders and remote lines whenever disabling leaks occur therein. One such safety valve assembly is shown in the copending United States patent application Ser. No. 525,631, filed Feb. 7, 1966, and the present invention comprises an improvement thereon.

Many safety valve assemblies have heretofore been proposed which function adequately for some conditions, but nevertheless there have been some difficulties encountered therewith which have prevented many of them from obtaining wide commercial acceptance. One of the problems frequently encountered is that previous safety valve systems were not sufficiently sensitive to respond to slow leaks in the hydraulic system, and another difficulty has been that a sudden surge of hydraulic pressure caused by jamming on the brakes of the vehicle might activate the device into a locked condition and thereby disable a portion of the vehicle braking system unnecessarily.

Accordingly, it is an object of the present invention to provide a new and improved safety valve system which overcomes the above mentioned difficulties.

Another object of the present invention is to provide a new and improved safety valve assembly for use in hydraulic fluid systems, especially in brake systems commonly used in vehicles.

Still another object of the present invention is to provide a new and improved safety valve assembly of the type described which is adequately sensitive to afford protection when slow leaks occur in the remote brake cylinders or lines leading thereto.

Another object of the present invention is the provision of a new and improved safety valve assembly of the type described which will not actuate unnecessarily when subjected to a surge of pressure and thereby disable needlessly a portion of the vehicle braking system.

Yet another object of the present invention is to provide new and improved sealing means for a hydraulic piston and cylinder assembly.

In accordance with these and many other objects, the present invention provides a new and improved safety valve assembly for a brake line system which comprises a cylinder means closed at opposite ends and having a fluid inlet opening and a fluid discharge opening in said respective ends. A piston is mounted for free sliding movement in the cylinder and divides the cylinder into inlet and outlet chambers adjacent respective ends of the cylinder. Passage means extending through the piston are provided for permitting a selected small fluid flow therethrough between the inlet and outlet chambers in the cylinder, and first valve means are mounted in the passage to open and close the passage. Biasing means are provided for acting upon the valve means to normally close communication between the discharge chamber and the passage. Port means are formed in the first valve means permitting a metered flow of fluid between opposite sides thereof through said passage means, and a seocnd valve member is mounted on the first valve for closing the port means in response to an increase in differential fluid pressure between the discharge chamber and the inlet chamber. Upon a normal application of braking pressure by depression of a brake pedal or the like, the pressure throughout the system is increased when the brakes are applied. Because of the instantaneous increase in pressure in the fluid within the system, the equalized pressure on opposite sides of the piston does not cause the piston to move towards one end or the other of the cylinder. As the wheel cylinder expands to apply the brakes, because of the increased hydraulic pressure in the system, fluid from the inlet chamber is permitted to pass through to the discharge chamber in the cylinder through the port means and second valve means which is maintained in an open position by the fluid flow. Should a fluid leak occur downstream of the safety valve assembly, the pressure in the discharge chamber of the cylinder is rapidly reduced to zero, even though the fluid volume loss may be slow and, accordingly, the pressure acting on the piston means from the inlet chamber side moves the piston rapidly downward and closes off the discharge end so that no fluid will be lost from the master cylinder or other portions of the system upstream of the safety device.

For a better understanding of the invention, reference should be had to the following detailed description and claims, taken in conjunction with the drawings, in which:

Figure 1:
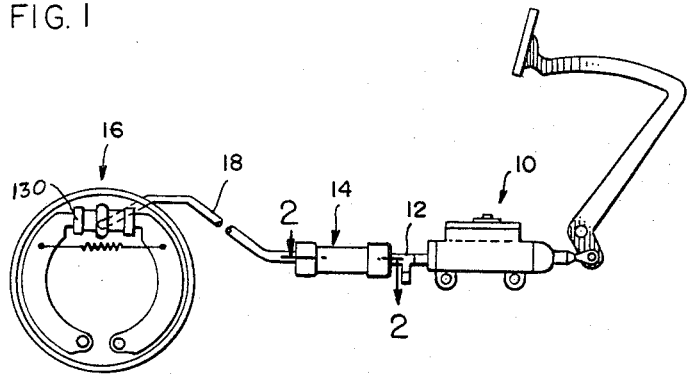
FIG. 1 is a schematic elevational view illustrating a safety valve assembly according to the present invention as installed in the hydraulic brake system of a motor vehicle.

Referring now to the drawings, and particularly to FIG. 1 thereof, there is shown a pedal operated hydraulic brake system master cylinder 10 from which extends a relatively rigid pressure line 12 for connection with a safety valve assembly 14 constructed in accordance with the present invention. The safety valve assembly 14, in turn, is connected to a remotely located brake cylinder assembly 16 by means of a conventional brake line 18.

Figure 2:
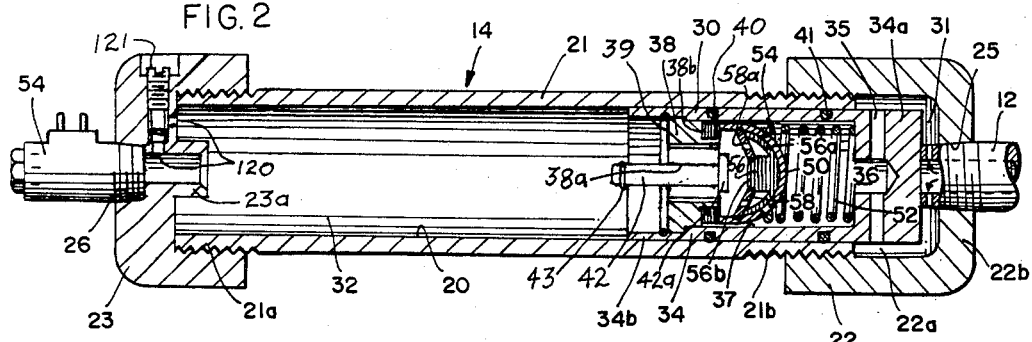
FIG. 2 is a longitudinal cross-sectional view of the safety device according to the present invention which shows the internal components therein in their normal operating position.

Referring now to FIG. 2, the safety valve assembly 14 comprises an elongated hollow cylinder 20 formed by a tubular member 21 which is closed at the inlet end thereof by an end cap 22 and is closed at the outlet end by a discharge end cap 23. The discharge end cap is threaded onto external threads 21a provided adjacent the discharge end of the tubular member 21 and, likewise, the inlet end cap 22 is threaded onto external threads 21b, formed adjacent the inlet end of the tubular member 21.

The inlet end cap 22 is internally threaded for only a limited portion along the length of its annular sidewall so that an enlarged cylindrical chamber 22a is formed between the discharge end 21b of the tubular member 21 and the end wall or head 22b of the inlet end cap 22. The end wall 22b of the inlet end cap is provided with a threaded central bore 25 into which is threaded one end of the rigid pressure line 12 from the master cylinder assembly 10. Similarly, the discharge end cap 23 is provided with a centrally located threaded bore 26 into which projects the threaded end portion of a pressure responsive switch 54 connected in the brake line 18. In the illustrated embodiment the housing of the pressure-responsive switch forms a part of the conduit for delivering the hydraulic fluid into the brake line 18.

A movable piston assembly 30 is slidably disposed within the cylinder 20 and divides the cylinder into an inlet chamber 31 and a discharge chamber 32. The piston assembly 30 includes a generally cup-shaped piston 34 having a head end 34a and an annular sidewall 34b opening to face the discharge chamber 32. In order to provide for fluid flow between the inlet chamber 31 and discharge chamber 32 through the piston assembly 30, the head end 34a of the piston is formed with a plurality of radially extending, drilled passageways 35 in the end of head 34a which are in communication with a central bore 36 also formed in the head 34a to communicate with an internal piston chamber 37 defined within the annular piston sidewall 34b. The open end of the piston assembly 34 facing the discharge chamber 32 is closed by means of an annular seat insert 38 which is retained in place by a suitable C-spring or retaining ring 39. The annular seat 38 is provided with a central bore 38a which slidably retains a movable pin 42 with an O-ring seal 43 attached to its forward tip which projects into the discharge chamber 32 from the end cap 23, so that when the piston assembly 34 is moved to the discharge end of the chamber, a hollow tubular projection 23a on the end cap 23 may receive the O-ring on the movable pin. The annular seat 38 is also provided with a plurality of metering ports 38c extending therethrough which, in the illustrated embodiment, comprises five ⅛" openings. During normal operation of the brake system, the piston assembly 34 does not move in the cylinder 20 during brake applications because of the increased volume of fluid on the discharge side of annular seat 38 which passes through the openings 38b in the seat 38 and stays in the position shown adjacent the inlet cap 22. A pair of O-rings 40 and 41 are mounted in recesses formed on the outer surface of the piston skirt 34b to seal tightly against the internal wall surface of the tubular member 21. When the piston assembly is in the position as shown, the passage 35 in the piston head 34a is in communication with the annular chamber 22a adjacent the inlet cap 22 and, accordingly, hydraulic fluid from the fluid line 12 enters the inlet chamber 31. This fluid flows through the passage 35 and central bore 36 into the internal piston chamber 37. In order to control the flow of fluid from the piston chamber through the seat bore 38a, into the discharge chamber 32, a cup-shaped, movable check valve member 50 is mounted in the piston member 34 for axial movement in the piston chamber. The cup-shaped valve member 50 is biased toward the annular seat member 38 by means of a compression spring 52, having one end bearing against the head 34a of the piston member. The open annular end portion of the cup-shaped valve member 50 is adapted to seat against a resilient annular washer 38b which is mounted in a shoulder or recess formed on the inner surface of the seat member 38.

In order to provide for a flow of fluid from the inlet chamber 31 to the discharge chamber 32, even though the cup-shaped valve member 50 is seated against the resilient washer 38b, the valve member 50 is formed with a plurality of small ports 54 therein and fluid flow through these ports is controlled by means of resilient flap or valve member 56 having an annular lip 56a adapted to normally close the ports on the inside of the cup-shaped valve member. A retaining washer 58 having a plurality of ports 58a therein permits the fluid which passes through the ports 54 to flow freely through the ports 38c and into the discharge chamber 32. The outer diameter of the cup-shaped valve member 50 within the piston chamber 37 is slightly smaller than the internal diameter of the piston chamber so that when the valve member is unseated and away from the washer 38, fluid can flow around the outer surface of the valve member from left to right, as shown in FIG. 2. When the cup-shaped valve member 50 is seated against the washer 38, as shown in FIG. 2, fluid from the piston chamber 37 flows from right to left only by passing through the ports 54 around the flexible lip 56a and ports or openings 58a in the retainer 58.

Operation of the safety valve member 14 is generally similar to that described in connection with the aforementioned copending patent application, with the exception that a biasing spring is not required to maintain the piston member 34 in its normal position adjacent the inlet end cap 22, as shown in FIG. 2. When the brake system is ready for operation and filled with hydraulic fluid and the vehicle operator then depresses the brake pedal thereby increasing the fluid pressure in the whole system instantaneously, the brake wheel cylinder of the brake mechanism 16 expands and begins to apply the brakes. During this time, the volume of fluid in the wheel cylinder increases and additional fluid is supplied from the inlet line 12 into the inlet chamber 31 of the valve assembly 14. This fluid flows through the passages in the piston member 34 into the piston chamber 37 and through the ports 54 of the valve member 50 into the discharge chamber 32 through the seat ports 38c. Because the fluid pressure on opposite sides of the piston assembly 34 is substantially equal, yet the fluid volume increases to whatever amount necessary under pressure in the discharge chamber which prevents any forward movement of piston. When the pressure on the brake pedal is relieved and the wheel cylinder contracts, fluid flows from the wheel cylinder through the flexible line 18 into the discharge chamber 32 and unseats the valve member 50 within the piston chamber 37 and then passes through the bore 36 and passages 35 into the inlet end chamber 31 of the valve assembly. During this back flow, the piston 34 remains stationary.

A similar situation occurs when heat expansion causes the hydraulic fluid in the wheel cylinder or brake line 18 to expand and the expanded fluid volume is taken care of by back flow through the piston, eventually reaching the reservoir of the hydraulic system in the master cylinder assembly 10.

Because the fluid medium within a closed system transmits pressure increases and decreases instantaneously throughout the entire system, no appreciable movement of the piston member 34 results during a sudden brake application, and small changes in volume, caused by heat expansion or wear in the wheel cylinder, are taken care of through the restricting action of the cup-shaped valve member 50 in the piston chamber.

Should the wheel cylinder or brake line 18 spring a leak downstream of the safety valve assembly 14, the pressure within the discharge end chamber 32 immediately drops to zero upon loss in the volume of fluid on the discharge side. In this case, the slidable piston member 34 is immediately moved toward the discharge end of the cylinder 21 by the pressure on the upstream side. The head 42a of the pin 42 will engage against the inner surface of the valve member 50 and the pin 42 will be driven into the tubular projection 23a of the end cap 23. At this time the O-ring 43 will seal the passageway in the tubular projection 23a. In this way there is no fluid loss from the discharge of the valve 14. Advantageously a permanent and tight seal is formed without any tendency for the seal to unseat due to slight seepage of fluid at the discharge end and the increased volume of fluid into the discharge chamber. An tendency of the piston member 30 to return after a seal is effected is compensated for by the lost motion connection between the pin 42 and the piston 30.

From the foregoing description, it should be noted that the safety valve assembly 14 of the present invention is simple and positive in operation and is not affected by sudden brake applications or surges of hydraulic pressure. Moreover, when a leak occurs downstream of the valve assembly 14, sealing off of the cylinder 21 is positive and rapid so that fluid upstream therefrom is not lost and thereby other portions of the vehicle braking system are not disabled.

To provide for bleeding of the brake system, the safety valve 14 may be provided with a suitable by-pass 120 around the permanent seal between the O-ring 43 and the projection 23a and which by-pass is controlled by an external valve. More specifically the by-pass 120 is controlled by a metering screw 121 which, when loosened, opens the by-pass for communication between the discharge chamber 32 and the discharge end of the brake system. Thus after a defect has been repaired, the brake system may be bled in the conventional manner, pressure or otherwise, thereby resetting the device without dismantling other than opening the metering screw to permit fluid to by-pass around the permanent seal. After several strokes of the brake pedal, the permanent seal will be pulled out of the tubular projection 23a and will return along with the piston assembly 30 to the stop adjacent port 35. The adjusting screw 121 may then be tightened to prevent fluid from by-passing around the permanent seal.

Figure 3:
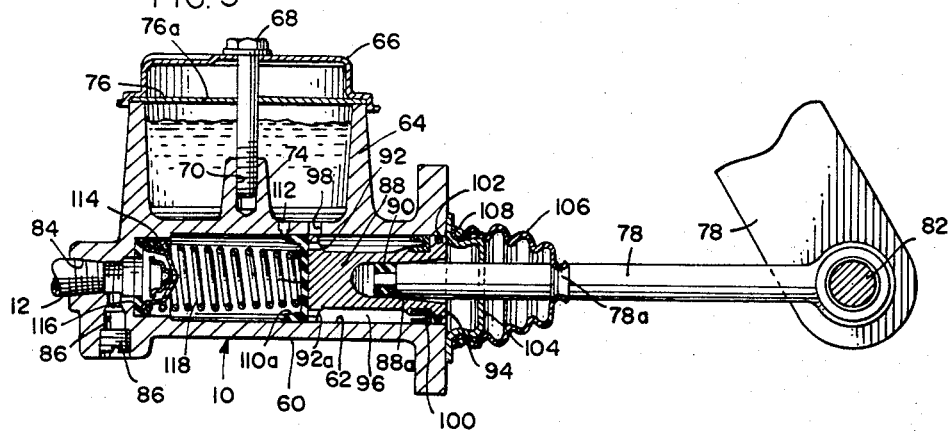
FIG. 3 is a longitudinal cross-sectional view of a master cylinder assembly for use with the safety valve system of the present invention.

Referring now to FIG. 3, therein is illustrated a new and improved master cylinder assembly 10 for use in the vehicle brake system illustrated in FIG. 1. The master cylinder assembly 10 includes a body 60 formed with a longitudinally extending lower pressure cylinder 62 and an upwardly extending reservoir 64 for supplying hydraulic fluid to the pressure cylinder. The upper end of the reservoir 64 is open to facilitate filling of the reservoir with hydraulic fluid and a removable cap member 66 is provided to close the open end of the reservoir during normal use. The cap member is secured in place by means of a cap screw 68 which extends downwardly through the cap member and is threadedly engaged within a bore 70 provided in an upstanding centrally located stem 74 extending upwardly from the bottom wall of the reservoir. A flexible diaphragm 76 is interposed between the upper end of the reservoir and the cap member to divide the enclosure into an upper air space or accumulator portion and a lower fluid well. The diaphragm is formed with a small port 76a to permit air to flow between the accumulator and the fluid well as the level of hydraulic fluid in the well changes.

The pressure cylinder 62 is closed at the discharge end thereof and open at the opposite end to accommodate a piston rod 78 extending outwardly and pivotally connected at its outer end to the lower end of a brake pedal lever 80 by means of a pin 82. The discharge end of the pressure cylinder is formed with an axially aligned threaded outlet opening 84 adapted to receive one end of the fluid line 12 and a transverse bleed passage 86 is drilled to communicate with the outlet opening 84 to permit bleeding of the cylinder when required. Normally, the bleed passage 84 is closed by a removable threaded plug 86 which is only removed when bleeding of the system is required.

In order to pressurize the fluid in the pressure cylinder 62 upon application of the brakes, a spool-type piston 88 is slidably mounted in the cylinder and is connected to the piston rod 78 which extends into a central bore 88a formed therein. An annular, resilient compression member 90 is mounted on the inner end of the piston rod 78 to cushion the shock on the piston 88 when the brakes are applied. The piston is formed with an annular flange 92 at its forward end and an annular flange 94 at its rearward end, which are dimensioned to slide smoothly within the cylinder 62, and these flanges define the ends of an annular chamber 96 around the central body of the piston. Fluid is delivered from the reservoir 64 to the annular chamber 96 through an inlet port 98, and in order to prevent this fluid from leaking out through the rearward end of the pressure cylinder 62 a sealing gasket 100 of resilient material is mounted in a recess formed on the forward side of the rearward end flange 94. The gasket 100 includes an outer lip which seals against the pressure cylinder wall and an inner lip which seals against the body of the piston, and fluid within the chamber 96 between the two lips of the gasket forces them apart to effect tight sealing at the rearward end of the piston. In addition, an O-ring 102 is mounted on the rearward flange 94 to seal off any rearward fluid flow not effectively sealed by the sealing gasket 100.

Outward travel of the piston 88 is limited by means of a cup-like stop member 104 having a flange which bears against the rearward face of the body 60 adjacent the open end of the pressure cylinder 62. The stop member 104 includes an opening therein to accommodate the rod 78, and a flexible boot 106 in the form of a bellows is provided to seal around the piston rod and stop member. The forward end of the boot is secured in place on the stop member 104 by a clamping ring 108, and the rearward end of the boot is seated within an annular recess 78a on the piston rod.

The forward end flange 92 of the piston is provided with a plurality of ports 92a to permit fluid in the piston chamber to flow forwardly from the annular chamber 96 toward the discharge outlet 84 in the pressure cylinder 62. In order to prevent back flow through the ports, a cup-like sealing gasket 110 is mounted on the forward face of the piston to normally close the ports, and the gasket is formed with an annular lip 110a which is adapted to seal against the wall of the pressure cylinder.

The piston 88 is illustrated in its normal position at the rear of the pressure cylinder when no braking force from the rod 78a is being applied. A small bleed port 112 forwardly of the larger port 98 is provided to permit hydraulic fluid to flow from the pressure cylinder back to the reservoir 64 when the brakes are not being applied, and thereby to accommodate fluid expansion within the system. When the brakes are applied, the piston moves forwardly in the cylinder and the flange 92 moves forwardly of the port 112 so that the fluid in the forward end of the cylinder is trapped and subjected to an increased pressure. As the wheel cylinders in the system expand, as previously described, fluid in the forward end of the pressure cylinder 62 flows into the line 12 through the outlet opening 84. In order to control this fluid flow and prevent rapid surges in pressure as the brakes are applied, a ported, cup-shaped check valve 114 is mounted in the forward end of the pressure cylinder 62 for seating engagement against an annular gasket seat 116 encircling the outlet opening 84. The check valve member is normally biased against the seat 116 by means of a spring 118 in the pressure cylinder which extends between the check valve member 114 and the forward face of the cup-shaped gasket 110 at the forward end of the piston 88. After the brake pedal has been released, the fluid in the system flows through the line 12 into the pressure cylinder 62 through the opening 84, causing the check valve member 114 to unseat. The returning fluid in the pressure cylinder moves the piston 88 rearwardly to the position shown in FIG. 3, uncovering the forward port 112 so an excess fluid can flow into the reservoir 64, as previously described.

It has been found that providing a separate safety valve 14 at each of the wheel cylinders, such as the cylinder 130, FIG. 1, the device may lock out any single defective brake without affecting the operation of the remainder of the brakes. Moreover by providing a dual wheel cylinder arrangement on each wheel, braking may be maintained at each wheel even though a defect occurs in one of the wheel cylinders.

From the foregoing description it should be noted that the new and improved master cylinder assembly 10, in cooperation with the safety device 14, provides an excellent and safe vehicle braking system.

Although the present invention has been described with reference to a single illustrative embodiment thereof, it should be understood that numerous other modifications and embodiments can be devised by those skilled in

What is claimed and desired to be secured by Letters Patent of the United States is:

1. A brake line safety valve assembly comprising cylinder means closed at opposite ends and having a fluid inlet opening and a fluid discharge opening in said respective ends, piston means freely slidable in said cylinder means for dividing said cylinder means into inlet and outlet chambers adjacent said respective ends, passage means extending through said piston means for permitting a selected small fluid flow therethrough between said inlet and outlet chambers, first valve means slidable in said passage means to open and close said passage means, biasing means in said passage means for acting on said first valve means to normally close communication between said discharge chamber and said passage means, port means in said first valve means for permitting metered fluid flow therethrough between said passage means and said discharge chamber, and second valve means mounted on said first valve means for closing said discharge opening in response to a loss of fluid in said discharge chamber.

2. The safety valve assembly of claim 1 wherein second valve means comprises a pin receivable within said fluid discharge opening.

3. The safety valve assembly of claim 2 wherein said valve is slidably connected to said piston to provide a lost-motion connection therebetween.

4. The safety valve assembly of claim 1 wherein said passage means includes a hollow valve chamber in said piston means closed at one end with an annular valve seat, said first valve means comprising a cup-shaped member having an annular open end for seating engagement against said annular valve chamber.

5. The safety valve assembly of claim 4 wherein said annular valve seat is provided with a plurality of metering ports extending therethrough, and said second valve comprises a pin slidably received in said annular valve seat and engageable within said fluid discharge opening.

6. The safety valve assembly of claim 1 and including a by-pass valve means around said second valve means.

References Cited

UNITED STATES PATENTS

| 1,724,881 | 8/1929 | Lund. | |
| 2,166,747 | 7/1939 | Best. | |
| 3,165,896 | 1/1965 | Baldwin | 60—54.6 |
| 3,178,890 | 4/1965 | Wallace | 60—54.6 |

FOREIGN PATENTS

| 486,512 | 9/1936 | Great Britain. |

MARTIN P. SCHWADRON, *Primary Examiner.*

ROBERT R. BUNEVICH, *Assistant Examiner.*